252-99 AU 166 EX
7/12/83 OR 4,392,974

United States Patent [19]

Hachmann

[11] 4,392,974

[45] Jul. 12, 1983

[54] LOW-PHOSPHATE DETERGENT BUILDER SALT MIXTURE AND PROCESS OF WASHING

[75] Inventor: Klaus Hachmann, Hilden, Fed. Rep. of Germany

[73] Assignee: Henkel Kommanditgesellschaft Auf Aktien, Dusseldorf-Holthausen, Fed. Rep. of Germany

[21] Appl. No.: 97,135

[22] Filed: Nov. 26, 1979

[30] Foreign Application Priority Data

Dec. 2, 1978 [DE] Fed. Rep. of Germany ....... 2852285

[51] Int. Cl.$^3$ .......................... C02F 1/42; C11D 3/06; C11D 3/12; C11D 3/20

[52] U.S. Cl. ...................................... 252/99; 252/131; 252/14 D; 252/155; 252/174.19; 252/174.25; 252/179; 252/DIG. 11

[58] Field of Search ............... 252/131, 135, 140, 155, 252/174.19, 174.25, 179, DIG. 11, 99; 8/137

[56] References Cited

U.S. PATENT DOCUMENTS 3,692,685 9/1972 Lamberti et al. ............. 252/174.19
3,965,169 6/1976 Stahlheber .................. 252/DIG. 11
3,990,983 11/1976 Lamberti .............................. 252/99

FOREIGN PATENT DOCUMENTS 2656251 6/1977 Fed. Rep. of Germany ...... 252/540
1473201 5/1977 United Kingdom ................ 252/131

*Primary Examiner*—Dennis L. Albrecht
*Attorney, Agent, or Firm*—Hammond & Littell, Weissenberger and Muserlian

[57] ABSTRACT

A low-phosphate detergent builder salt mixture consisting of (a) from 45% to 75% by weight of a water-insoluble, finely-divided, synthetic, crystalline alkali metal aluminosilicate with a calcium binding power of from 50 to 200 mg CaO/gm at 22° C., (b) from 15% to 40% by weight of sodium or potassium carboxymethyloxysuccinate, and (c) from 5% to 15% by weight of sodium or potassium tripolyphosphate; as well as use of the same in detergents in amounts of 25% to 60% by weight with the proviso that the total tripolyphosphate content in the detergent does not exceed 5% by weight.

10 Claims, No Drawings

LOW-PHOSPHATE DETERGENT BUILDER SALT MIXTURE AND PROCESS OF WASHING

BACKGROUND OF THE INVENTION

This invention relates to an improved builder salt mixture for washing and cleansing agents containing water-insoluble, finely-divided aluminosilicates, carboxymethyloxysuccinates and small amounts of tripolyphosphates.

German published application DAS No. 2,412,837, corresponding to British Pat. No. 1,473,201 and U.S. Patent application Ser. No. 956,851, filed Nov. 2, 1978 (being a continuation-in-part of Ser. No. 800,308, filed May 25, 1977, now abandoned, which, in turn, is a continuation of Ser. No. 458,306, filed Apr. 5, 1974, and now abandoned), now abandoned in favor of Ser. Nos. 330,593, 330,594 and 330,645, all filed Dec. 14, 1981, describes washing, rinsing and cleansing compositions with a content of synthetic, crystalline alkali metal aluminosilicates which are suitable to completely or partly replace the phosphates usually contained in washing agent compositions. According to the teaching of these patents, the cation-exchanging aluminosilicates are used to improve and accelerate the washing process, preferably together with water-soluble sequestering agents. Optimum results, particularly as far as the secondary washing power is concerned, are obtained if the share of polymeric phosphates in the detergent is above 15%, and according to British Pat. No. 1,473,201, between 15% and 25%. In those cases where the law requires a lower phosphate or phosphorus content, problems may arise in hard water regions, since a lower phosphate content can cause, in frequently washed laundry, an insufficient secondary washing effect, and particularly causes fiber incrustations. The use of large quantities of other sequestering agents, particularly of aminopolycarboxylic acids, like nitrilotriacetic acid (NTA) or ethylenediaminetetraacetic acid (EDTA), leads to a satisfactory secondary washing effect, but it raises new, still unsolved sewage problems, for example, relating to a possible heavy metal re-mobilization. The same holds true for washing agent compositions containing large amounts of polyphosphonic acids, which may lead to a certain phosphate pollution, due to their phosphorus (P) content.

The German published application DOS No. 2,057,258, corresponding to U.S. Pat. No. 3,990,983, suggests using a carboxymethyloxy-succinate (CMOS) salt as a phosphate substitute in washing agent compositions. Such a substitution does not have the above-mentioned drawbacks. However in the interest of a satisfactory primary and secondary washing power, patentee recommends the use of larger amounts of phosphate, up to a ratio of CMOS to tripolyphosphate of 1:1, which obviates the desired aim of keeping the phosphorus content at a minimum.

German published application DOS No. 2,656,251 describes detergents which contain both CMOS and alkali metal aluminosilicates as builder salts, and which are said to be substantially phosphate free. In this patent, a comparison detergent is listed which is said to have improved whiteness power and contains 17% alkali metal aluminosilicates, 17% CMOS and 17.5% sodium tripolyphosphate (given in % by weight), the P-content of this mixture is undesirably high for the above mentioned reasons, so that it is unsuitable for the desired purpose.

OBJECTS OF THE INVENTION

An object of the present invention is to develop a washing builder composition for use in washing, rinsing and cleansing agent compositions with a low phosphate content, to give a good primary and secondary washing effect in the absence of problematic sequestering agents, and which thus avoids the drawbacks in the above-mentioned detergents.

Another object of the present invention is the development of a builder salt mixture for washing, rinsing and cleansing agent compositions consisting essentially of (a) from 45% to 75% by weight of at least one water-insoluble, finely-divided, synthetic, crystalline alkali metal aluminosilicate containing at least some combined water and having primary particles in the size range of from 50μ to 0.01μ and a calcium binding power of from 50 to 200 mg CaO/gm of anhydrous active substance when measured at 22° C. by the Calcium Binding Power Test Method set out in the specification and the formula on the anhydrous basis.

$$0.7\text{-}1.5\ Me_2O.Al_2O_3.1.3\text{-}4.0\ SiO_2$$

where Me is an alkali metal, (b) from 15% to 40% by weight of at least one carboxymethyloxysuccinate selected from the group consisting of sodium carboxymethyloxysuccinate and potassium carboxymethyloxysuccinate, and (c) from 5% to 15% by weight, based on the anhydrous salt, of a tripolyphosphate selected from the group consisting of sodium tripolyphosphate and potassium tripolyphosphate.

A further object of the present invention is the use of the above builder salt mixture in washing, rinsing and cleansing agent compositions in amounts of from 25% to 60% by weight, with the proviso that the content of the phosphosphate component (c) does not exceed 5% by weight of the total composition.

A yet further object of the present invention is the improvement in process of washing employing the above builder salt mixture in washing, rinsing and cleansing agent compositions as sole builder salt component.

These and other objects of the present invention will become more apparent as the description thereof proceeds.

DESCRIPTION OF THE INVENTION

The subject matter of the invention is a low-phosphate builder salt mixture which is suitable for use in washing, rinsing and cleansing agent compositions and which is characterized by a content of the following components:

(a) from 45% to 75% by weight of a water-insoluble, finely divided, synthetic, crystalline alkali metal aluminosilicate containing bound water, and having the formula $$0.7\text{-}1.5\ Me_2O.Al_2O_3.1.3\text{-}4.0\ SiO_2$$

(based on the anhydrous active substance AS), which has a calcium binding power of 50 to 200, preferably 100 to 200 mg CaO/g AS, where Me denotes an alkali metal, especially sodium or potassium, (b) from 15% to 40% by weight of sodium or potassium carboxymethyloxysuccinate, and (c) from 5% to 15% by weight of sodium or potassium tripolyphosphate (based on the anhydrous salt).

More particularly, the present invention relates to a builder salt mixture for washing, rinsing and cleansing agent composition consisting essentially of (a) from 45% to 75% by weight of at least one water-insoluble, finely-divided, synthetic, crystalline alkali metal aluminosilicate containing at least some combined water and having primary particles in the size range of from 50μ to 0.01μ and a calcium binding power of from 50 to 200 mg CaO/gm of anhydrous active substance when measured at 22° C. by the Calcium Binding Power Test Method set out in the specification and the formula on the anhydrous basis $$0.7\text{-}1.5\ Me_2O.Al_2O_3.1.3\text{-}4.0\ SiO_2$$

where Me is an alkali metal, (b) from 15% to 40% by weight of at least one carboxymethyloxysuccinate selected from the group consisting of sodium carboxymethyloxysuccinate and potassium carboxymethyloxysuccinate, and (c) from 5% to 15% by weight, based on the anhydrous salt, of a tripolyphosphate selected from the group consisting of sodium tripolyphosphate and potassium tripolyphosphate.

In a preferred embodiment, the builder salt mixture of the invention has the following compositon:

from 50% to 75% by weight most preferably
from 52% to 70% by weight, of component a
from 20% to 35% by weight of component b
from 8% to 15% by weight most preferably
from 8% to 12% by weight, of component c
each in the form of their sodium salts.

Another subject matter of the invention is the use of the above-defined building salt mixture as a component of detergents and cleansers in amounts of 25 to 60% by weight, preferably 30 to 50% by weight, with the proviso that the content of phosphate (component c) does not exceed 5% by weight in the detergent or cleanser. It was a great surprise that this relatively small amount of polyphosphate is quite sufficient for the desired aim, that is, detergents of the above composition have not only a high primary detergent power, but they also prevent greying and incrustations of the fabric, even after repeated use.

More particularly therefore, the present invention relates to a washing, rinsing and cleansing agent composition comprising builder salts, tensides, wash alkalies, and optionally other conventional additives for washing, rinsing and and cleansing agent compositions wherein said builder salts are present in an amount of from 25% to 60% by weight and consist of a builder salt mixture for washing, rinsing and cleansing agent compositions consisting essentially of (a) from 45% to 75% by weight of at least one water-insoluble, finely-divided synthetic, crystalline alkali metal aluminosilicate containing at least some combined water and having primary particles in the size range of from 50μ to 0.01μ and a calcium binding power of from 50 to 200 mg CaO/gm of anhydrous active substance when measured at 22° C. by the Calcium Binding Power Test Method set out in the specification and the formula on the anhydrous basis $$0.7\text{-}1.5\ Me_2O.Al_2O_3.1.3\text{-}4.0\ SiO_2$$

where Me is an alkali metal, (b) from 15% to 40% by weight of at least one carboxymethyloxysuccinate selected from the group consisting of sodium carboxymethyloxysuccinate and potassium carboxymethyloxysuccinate, and (c) from 5% to 15% by weight, based on the anhydrous salt, of a tripolyphosphate selected from the group consisting of sodium tripolyphosphate and potassium tripolyphosphate, with the proviso that the amount of said tripolyphosphate component (c) in said washing, rinsing and cleansing agent composition does not exceed 5% by weight.

The suitable cation-exchanging alkali metal aluminosilicates (component a) are principally the crystalline products described in DAS No. 2,412,837 referred to above. These alkali metal aluminosilicates generally have particle sizes below 50μ, substantially below 40μ, and mostly in the range of 20 to 0.1μ. In particular, the particle size range is from 50μ to 0.01μ.

Preferably crystalline sodium aluminosilicates of the composition $$0.7\text{-}1.1\ Na_2O.Al_2O_3.1.3\text{-}2.4\ SiO_2$$

(on the anydrous basis) are used in the detergents according to the invention. These aluminosilicates are also called "zeolite NaA". Particularly products of this composition and crystal structure are employed where care is taken, by suitable selection of the mixing conditions, that the resulting crystallites have rounded corners and edges and their particle size is below 30μ, of which at least 80% are in the range of 8 to 0.01μ, the mean particle diameter being between 3 and 6μ. These aluminosilicates with rounded corners and edges are described in German publish application DOS No. 2,531,342 corresponding to U.S. patent application Ser. No. 572,856, filed Apr. 29, 1975, and now abandoned.

According to observations of the applicants both the calcium ions and the magnesium ions of the wash waters, which are generally present in waters of average hardness in a ratio of Ca:Mg about 5:1, are equally bound by the aluminosilicate when used in the washing machine under high temperature conditions. The removal of the calcium hardness and of the magnesium hardness presents no problem even in artifical hot wash liquors of 16°dH (German hardness) and a ratio of calcium ions to the magnesium ions of 1:1.

An accelerated removal of the magnesium hardness, even considerably below the boiling temperature is possible if a sodium aluminosilicate according to component (a) of the composition $$0.7\text{-}1.35\ Na_2O.Al_2O_3.1.3\text{-}2.4\ SiO_2$$

(on the anhydrous basis) is used, which represents a binary mixture of 40% to 90% particles of zeolite NaA and 10% to 60% particles of zeolite HS (hydrosodalite). Such an aluminosilicate already has a calcium binding power of 100 to 165 mg CaO/gm and a magnesium binding power of 50 to 110 mg MgO/gm based on the anhydrous substance in a wash liquor of 50° C. Reference is also explicitly made within the framework of this invention to the disclosure in German published application DOS No. 2,543,941 where these aluminosilicate mixtures, their production and use are described.

The crystalline aluminosilicates can be obtained, for example, by reacting water-soluble silicates with water-soluble aluminates in the presence of water. To this end aqueous solutions of the starting materials can be mixed with each other, or a component, which is present in solid form, can be reacted with the other component, which is present as an aqueous solution. The desired aluminosilicates can also be obtained by mixing the two components in solid form in the presence of water. Aluminosilicates can also be obtained from $Al(OH)_3$, $Al_2O_3$ or $SiO_2$ by reacting them with alkali metal silicate solutions or alkali metal aluminate solutions, respectively.

The preferred alkali metal aluminosilicates have a calcium-binding power of 100 to 200 mg CaO/gm AS, mostly 100 to 180 mg CaO/gm AS. This is found particularly in compounds of the composition $$0.7\text{–}1.1\ Na_2O.Al_2O_3.1.3\text{–}3.3\ SiO_2.$$

This summation formula comprises two types of different crystal structures, which also differ by their summation formula. These are:

$$0.7\text{ to }1.1\ Na_2O.Al_2O_3.1.3\text{ to }2.4\ SiO_2 \quad (1)$$

$$0.7\text{ to }1.1\ Na_2O.Al_2O_3.>2.4\text{ to }3.3\ SiO_2 \quad (3)$$

The different crystal structures can be seen in the X-ray diffraction diagrams and are referred to as NaA and NaX.

These compounds, characterization and their use in washing, rinsing and cleansing agent compositions are described in the German published application DAS No. 2,412,837 referred to above.

The aluminosilicates which are still moist from their production, and which can be present as aqueous suspensions or moist filter cakes, can be converted in known manner to dry powders by removing at first a part of the water by mechanical means and drying them subsequently, at temperatures of 50° to 400° C. Depending on the drying conditions, the powdered product contains from 5% to 35% by weight of bound water. Preferably the drying temperature should not exceed 200° C. if the aluminosilicate is to be used in detergents and cleansers. Anhydrous but inactive products are obtained by drying at 800° C. for 1 hour.

Drying can be eliminated if the product is converted according to British Pat. No. 1,529,713, corresponding to U.S. Pat. Nos. 4,072,622 and 4,169,075, with certain dispersing agents and water to a stable suspension and the latter is used for processing to the builder salt mixtures according to the invention or to detergents containing the latter. Apart from savings in energy, due to the elimination of the drying stage, agglomeration to undesired large particles (secondary particles) as it is observed in conventional drying, which requires grinding and screening, is avoided by this procedure.

The aluminosilicates are preferably used while they are still moist from their production, as suspensions or as moist filter cakes, by transforming them first, if necessary by adding additional water and a dispersing agent, into stable, pumpable suspensions with an aluminosilicate content of 25% to 40% by weight, based on the anhydrous substance, and a content of 0.3% to 4% by weight of the dispersing agent. Suitable as dispersing agents are compounds which are themselves effective as detergent ingredients, such as ethoxylated aliphatic $C_{10}$–$C_{20}$ fatty alcohol with an average degree of ethoxylation of 2 to 7 mols of ethylene oxide (EO). Pumpable, stable aluminosilicate suspensions, with ethoxylated alcohols, like tallow alcohol + 5 mols of ethylene oxide or with fatty acid ethanolamides, such as lauric acid monoethanolamide, as a dispersing agent, are described in British Pat. No. 1,529,713 referred to above. Ethoxylated adducts of the reaction product of epoxy-alkanes and low molecular weight amines are also suitable as dispersing agents for aluminosilicates suspensions. These suspensions produced by mixing aluminosilicate, water and dispersing agent, are characterized by great stability; they can be stored at room temperature, or at higher temperatures, shipped through pipe lines, in tank cars or in any other way, before they are processed to the builder salt mixtures according to the invention or the washing agent compositions containing them.

Another variant for the production of the builder salt mixtures containing washing agent compositions according to the invention consists in using the aluminosilicates in the form of a powder containing varying amounts of bound water, together with the other builder salts or together with sodium perborate as a solid substrate for the addition of liquid or viscous washing agent ingredients, for example, nonionic tensides. These compounds are converted to fluid premixes by spraying their solutions or melts on the solid substrates, which are then mixed in known manner, with the other powdered ingredients of the detergent. These premixes and their production are described more fully in German Published Application DOS No. 2,507,926, corresponding to U.S. Pat. No. 4,136,051.

All data concerning the water content or solids content or the content of active substance (AS) in the aluminosilicates refer, unlike the above indicated water content, to the state which is achieved after drying for 1 hour at 800° C. In this drying process, the adhering and the bound water are practically completely removed.

The calcium binding power of the aluminosilicates is determined by mixing 1 liter of an aqueous solution containing 0.594 gm of $CaCl_2$ (=300 mg CaO/1=30°dH) and standarized with dilute NaOH to a pH-value of 10, with 1 gm of aluminosilicate (related to AS), and then vigorously stirring the suspension for 15 minutes at a temperature of 22° or 50° or 90° C. After filtering off the aluminosilicate, the residual hardness x of the filtrate is determined, from which the calcium-binding power for the aluminosilicate is calculated with $(30-x)$. 10 mg CaO/gm AS. This test is referred to hereinafter as the Calcium Binding Power Test Method.

The particle size of the aluminosilicates can be determined, for example, by means of sedimentation analysis.

If no use is made of the above-described special preparation methods, the combination of aluminosilicate with the other builder salts and other washing agent ingredients, if necessary, can be effected by simply mixing the powdered or granular components, preferably with simultaneous granulation, or by combining the individual components to an aqueous pasty batch with subsequent spray-drying. If the builder salt mixture according to the invention is used in washing, rinsing and cleansing agent compositions, these can also contain conventional anionic, nonionic or zwitter-ionic surface-active compounds or tensides, wash alkalies, additives to increase the washing power, greying inhibitors or soil suspension agents, bleaches, optical brighteners, stabilizers, as well as other additives used in such washing agent compositions.

Suitable anionic tensides are those of the type of the sulfonates, sulfates and carboxylates, which contain in the molecule at least one hydrophobic hydrocarbon radical and one water-solubilizing anionic group. The hydrophobic hydrocarbon radical can be either aliphatic or alkylaromatic. Aliphatic hydrocarbon radicals are preferably straight-chained and contain 10 to 22, particularly 12 to 18 carbon atoms. Alkylaromatic hydrocarbon radicals are preferably phenyl with 8 to 16, preferably 9 to 12 carbon atoms in the linear alkyl radical.

Surfactants of the sulfonate type which can be used are the alkylbenzene sulfonates with $C_{9-15}$-alkyl groups and the alkane sulfonates prepared by sulfochlorination or sulfoxidation and subsequent hydrolysis or neutralization of $C_{12-18}$-alkanes or by bisulfite addition onto $C_{12-18}$-olefins. Other suitable tensides of the sulfonate type are the esters of $\alpha$-sulfo fatty acids, that is the $\alpha$-sulfonated methyl or ethyl esters of hydrogenated coconut, palm kernel or tallow fatty acids, as well as the olefin sulfonates, that is, mixtures of alkene sulfonates, hydroxyalkane sulfonates, as well as alkane disulfonates, as produced from monolefins with terminal or non-terminal double bonds by sulfonation with gaseous sulfur trioxide and subsequent alkaline or acid hydrolysis of the sulfonation products.

Suitable tensides of the sulfate type are the sulfuric acid mono-esters of aliphatic primary alcohols of natural or synthetic origin, that is, from fatty alcohols, like coconut fatty alcohols, tallow fatty alcohols, oleyl alcohol, lauryl alcohol, myristyl alcohol, palmityl alcohol, or stearyl alcohol, or the $C_{10}$–$C_{20}$-oxoalcohols, and those of secondary alcohols of this chain length.

The sulfuric acid monoesters of the aliphatic alcohols ethoxyated with 1 to 6 mols of ethylene oxide such as the ethoxylated primary alcohols listed above, or the ethoxylated secondary alkanols, or alkylphenols, are likewise suitable. Also suitable are sulfated fatty acid alkanolamides and sulfated fatty acid monoglycerides.

The carboxylates which can be used are soaps, for example, those of coconut fatty acids or tallow fatty acids or of foam-inhibiting mixtures containing behenic acid, also ether carboxylic acids, such as the salts of carboxymethyl($C_{10}$–$C_{18}$) alkyl ethers.

The anionic tensides can be present in the form of their alkali metal salts such as sodium, potassium, or as the ammonium salts, as well as water-soluble salts of organic bases, such as lower alkylamines and lower alkanolamines, like mono-, di- or triethanol amine.

The nonionic tensides which can be employed with the builder salt mixtures according to the invention are the additional products of 2 to 20, preferably 3 to 15 mols of ethylene oxide onto 1 mol of an aliphatic compound with substantially 10 to 20 carbon atoms from the group of the alcohols, and carboxylic acids or alkylphenyl. Examples are the addition products of 8 to 20 mols of ethylene oxide onto primary alcohols, such as coconut fatty alcohols or tallow fatty alcohols, onto oleyl alcohol, onto oxoalcohols of the corresponding chain length, or onto corresponding secondary alcohols, as well as onto mono- or dialkyl phenols with 6 to 14 carbon atoms in the alkyl radicals. In addition to these water-soluble nonionics, it is also possible to use polyglycol ethers with 2 to 7 ethylene glycol ether radicals which are not or not completely water-soluble, particularly if they are used together with water-soluble nonionic or anionic tensides. Of particular practical interest are the ethoxylation products of primary aliphatic alkanols and alkenols because of their good biodegradability.

Typical representatives of the nonionic tensides that can be used according to the invention with an average degree of ethoxylation of 2 to 7 are, for example, coconut fatty alcohol+3-EO (EO=ethylene oxide), tallow fatty alcohol+5-EO, oleyl/cetylalcohol+5-EO (iodine number 30–50), tallow fatty alcohol+7-EO, synthetic $C_{12}$–$C_{16}$ fatty alcohol+6-EO, $C_{11}$–$C_{15}$-oxoalcohol+3-EO, $C_{14}/C_{15}$ oxoalcohol+7-EO, i-$C_{15}$–$C_{17}$-alkanediol+5-EO (i=nonterminal); sec. $C_{11}$–$C_{15}$-alkanol+4-EO.

Representatives of the nonionic tensides with an average degree of ethoxylation of 8 to 20, particularly 9 to 15, are compounds such as coconut fatty alcohols+12-EO, synthetic $C_{12}/C_{14}$-fatty alcohol+9-EO, oleyl/-cetyl alcohol +10−EO, tallow fatty alcohol+14EO, $C_{11}$–$C_{15}$-oxoalcohol+13−EO, $C_{15}$–$C_{18}$-oxoalcohol+15−EO, i-$C_{15}$–$C_{17}$-alkanediol+9−EO, $C_{14}/C_{15}$-oxoalcohol+11−EO, sec. $C_{11}$–$C_{15}$-alkanol+9−EO.

Also suitable as nonionic tensides are the water-soluble products containing 20 to 250 ethylene glycol ether groups and 10 to 100 propylene glycol ether groups, products of ethylene oxide adducted onto polypropyleneglycol, alkylene diaminepolypropylene glycol or alkyl polypropylene glycols with 1 to 10 carbon atoms in the alkyl in which the polypropylene glycol chain acts as a hydrophobic radical. Nonionic tensides of the type of the aminoxides or sulfoxides can also be used, for example, N-coconut alkyl-N,N-dimethylaminoxide, N-hexadecyl-N,N-bis-(2,2-dihydroxypropyl)-aminoxide, N-tallow alkyl-N,N-dihydroxyethyl aminoxide.

Amphoteric tensides are compounds which contain both an anionic and a cationic group in the same molecule. Suitable compounds are the derivatives of aliphatic $C_8$–$C_{18}$-alkylamines with a water-solubilizing group, such as a carboxyl group, a sulfo group or a sulfate group. Typical representatives of the amphoteric tensides are the sodium salts of 2-dodecyl-aminopropionic acid and of 3-dodecylaminopropane sulfonic acid and similar compounds, such as sulfated imidazoline derivatives.

The zwitterionic tensides are preferably derivatives of aliphatic quaternary ammonium compounds, where one of the aliphatic radicals consists of a $C_8$–$C_{18}$ radical, and another contains an anionic water-solubilizing carboxy, sulfo or sulfato group. Typical representatives of these surface-active betaines are, for example, 3-(N-hexadecyl-N,N-dimethyl-ammonio)-propane sulfonate; 3-(N-tallow alkyl)-N,N-dimethyl-ammonio)-2-hydroxypropane-sulfonate; 3-(N-hexadecyl-N,N-bis-(2-hydroxyethyl)-ammonio)-2-hydroxypropyl-sulfate; 3-(N-coconut alkyl-N,N-bis-(2,3-dihydroxypropyl)-ammonio)propane-sulfonate; N-tetradecy-N,N-dimethyl-ammonio-acetate; N-hexadecyl-N,N-bis-(2,3-dihydroxypropyl)-ammonio-acetate.

The wash-alkalies which can be used are the alkali metal carbonates, bicarbonates and silicates, such as the potassium, and particularly the sodium salts; in the case of the sodium silicates, the ratio $Na_2O$:$SiO_2$ is between 1:1 and 1:3.5. The amount of wash-alkalies is so selected that the pH-value of the wash liquor solution is between 8.5 and 13, preferably between 9.5 and 11.5.

The customary bleaches can be used, such as perhydrates, like the alkali metal perborates, percarbonates, perpyrophosphates and persilicates, and urea perhydrate, preference being given to sodium perborate-tetrahydrate. Detergents to be used at low washing tempertures can additionally contain bleach activators, such as tetraacetylethylene diamine or tetraacetyl glycoluril. Also suitable as bleach components are active chlorine compounds, particularly potassium or sodium dichloroisocyanurates. As a protection against premature decomposition, the bleach activators or active chlorine compounds can be embedded in water-soluble enveloping substances or in substances melting at the anticipated washing temperatures.

The detergents can contain optical brighteners. For cotton, particularly derivatives of diaminostilbene-disulfonic acid or its alkali metal salts can be employed. Suitable are salts of 4,4'-bis-(2-anilino-4-morpholino-1,3,5-triazin-6-yl-amino)-stilbene-2,2'-disulfonic acid or similarly structured compounds which carry a diethanolamino group, a methylamino group or a 2-methoxyethylamino group, instead of the morpholino group. As optical brighteners for polyamide fibers, those of the type of the 1,3-diaryl-2-pyrazolines can be employed, for example, 1-(p-sulfamoylphenyl)-3-(p-chlorophenyl)-2-pyrazoline, as well as similarly structured compounds which carry, instead of the sulfamoyl group, the methoxycarbonyl group, the 2-methoxyethoxycarbonyl group, the acetylamino group or the vinylsulfonyl group. Suitable polyamide brighteners are also the substituted aminocumarins, such as 4-methyl-7-dimethylaminocumarin or 4-methyl-7-diethylaminocumarin. Furthermore the compounds 1-(2-benzimidazolyl)-2-(1-hydroxyethyl)-2-benzimidazolyl-ethylene and 1-ethyl-3-phenyl-7-diethylamino-carbostyril are also suitable as polyamide brighteners. Brighteners for polyester and polyamide fibers which can be used are the compounds 2,5-di-(2-benzoxazolyl)-thiophene, 2-(2-benzoxazolyl)-naphtho-(2,3-b)-thiophene and 1,2-di-(5-methyl-2-benzoxazolyl)-ethylene. Also suitable are optical brighteners of the type of the substituted 4,4'-distyryl-diphenyls, such as 4,4'-bis-(4-chloro-3-sulfostyril)-diphenyl. Mixtures of the above-mentioned optical brighteners can also be used.

The preparations can also contain soil suspension agents or greying inhibitors which keep the soil which is released from the fibers in suspension in the liquor, thus preventing greying. Suitable for this purpose are water-soluble colloids, mostly of an organic nature, such as the water-soluble salts of polymeric carboxylic acids, glue, gelatin, salts of ether carboxylic acids or ether sulfonic acids of starch or cellulose, or salts of acid sulfuric esters of cellulose or starch. Water-soluble polyamides containing acid groups, as well as polyvinylpyrrolidone are likewise suitable. Preferred is carboxymethylated cellulose in the form of its sodium salt. Other examples of suitable cellulose ethers are methyl cellulose, hydroxyethyl cellulose, methyl-hydroxyethyl cellulose, methyl-hydroxypropyl-cellulose, methyl-hydroxybutyl cellulose and methyl-carboxymethyl cellulose the latter in the form of a sodium salt.

Stabilizers for the bleaching agents and optical brighteners which can be used are the customary inorganic and organic bleaching agent stabilizers such as magnesium salts, particularly magnesium silicates, as well as organic sequestering agents, like ethylene diaminetetraacetic acid or its homologs or aminoalkane polyphosphonic acids and hydroxyalkane polyphophonic acids, such as 1-aminoethane-1,1-diphosphonic acid, amino-(trimethylene phosphonic acid), 1-hydroxyethane-1,1-diphosphonic acid, as well as their homologs, in the form of their sodium- or potassium salts, both employed in amounts of up to 1%.

Other suitable washing agent aids and additives are neutral salts, particularly sodium sulfate, enzymes, particularly bacterial proteases, foam inhibitors, like silicone defoamers, handle improving agents, biocides, as well as dyes and perfumes.

The washing agent compositions containing the builder salt mixture according to the invention preferably have the following composition:

- from 25% to 60% by weight, preferably from 30% to 50% by weight of the builder salt mixture,
- from 5% to 20%, preferably from 7% to 15% by weight of one or more of the above mentioned tensides,
- from 0 to 8% by weight, preferably from 2% to 5% by weight of sodium silicate,
- from 0 to 30% by weight, preferably from 15% to 25% by weight of sodium perborates-tetrahydrate,
- from 0 to 10% by weight, of other wash-alkalies, preferably sodium carbonate,
- from 0 to 1% of an organic nitrogen containing or phosphorus containing sequestering agent, and
- from 1% to 30% by weight, of soil suspension agents, optical brighteners, enzymes, biocides, fabric softeners, dyes and perfumes, sodium sulfate and water.

Whereby the composition and the amount of the builder salt mixture listed in first place is so selected that the total content of sodium or potassium tripolyphosphate in the detergent does not exceed 5% by weight.

The builder salt mixture according to the invention and the detergents and cleaners containing this mixture are characterized not only by a low and therefore non-polluting phosphate content and a low or zero content of organic nitrogen containing or phosphorus containing sequestrants, but regardless of this small amount of highly effective builder salts, they have a great soil release power (primary detergent power), as well as a high secondary detergent power, which prevents to a great extent fabric incrustations and fabric greying, and which is equivalent to that of a conventional detergent containing large amounts of phosphates, in the order of 40% by weight of tripolyphosphates.

The following examples are illustrative of the practice of the invention without being limitative in any respect.

EXAMPLES

The washing agent composition employed for the tests had the following composition (in % by weight)

| % by weight |
|---|
| 6.0 linear Na dodecyl benzene sulfonate |
| 3.0 ethoxylated tallow alcohol with 14 EO groups (EO = ethylene oxide) |
| 2.0 ethoxylated tallow alcohol with 5 EO groups |
| 3.0 tallow fatty acid, Na soap |
| 3.0 sodium silicate ($Na_2O:SiO_2$ = 1:3.3) |
| 2.0 magnesium silicate |
| 0.2 EDTA (Na salt) |
| 2.0 carboxymethyl cellulose (Na salt) |
| 20.0% sodium perborate-tetrahydrate |
| 6.0% water |
| 22.8% to 50% builder salt mixtures |
| balance to 100% sodium sulfate. |

An aluminosilicate was prepared according to the following procedure:

Aluminosilicate Im

Precipitation batch: 2.985 kg of an aluminate solution of the composition: 17.7% $Na_2O$, 15.8% $Al_2O_3$, 66.5% $H_2O$; 0.150 kg of sodium hydroxide, 9.420 kg of water and 2.445 kg of a 25.8% solution of a sodium silicate of the composition: 1 $Na_2O$. 6 $SiO_2$, freshly prepared from commercial waterglass and alkali-soluble silica.

Precipitation: the suspension of the amorphous precipitate was stirred for 10 minutes with an intensive stirrer (10,000 rpm);

Crystallization: 6 hours at 90° C.

Drying: 24 hours at 100° C.

Composition: 0.9 $Na_2O$. 1 $Al_2O_3$.2.04 $SiO_2$.4.3 $H_2O$ (=21.6% $H_2O$);

Degree of crystallization: fully crystalline.

Calcium binding power: 170 mg CaO/gm AS

Particle size (by sedimentation analysis) 100% less than 40μ; 85-95% less than 10μ; maximum of particle size distribution: 3-6μ.

Tripolyphosphate (TPP) and CMOS were used as sodium salts. The composition of the builder salt mixture or of the reference mixture can be seen from Table I. In this Table I, two percentages are given in the table for each component; the first number refers to the portion of the compound in the total detergent, the second number (in brackets) refers to the portion of the compound by weight in the builder salt mixture.

Fabric samples of cotton, finished cotton, and a blend of polyester and cotton soiled under standarized conditions were washed with these washing agent compositions in an automatic household washing machine with horizontal drum under the following conditions: 2.2 kg of textile material, of which 200 gm was the soiled fabric (test fabric from the Laundry Research Institute in Krefeld, Germany), water hardness 16°dH, (german hardness), detergent concentration 7.5 gm/l, liquor ratio 1:5, temperature either 95° to 60° C., washing time 30 minutes at 95° C. or 15 minutes at 60° C., then four rinsing and spinning cycles. The whiteness (or brightness), measured by photometry, is a measure of the primary washing power, the whiteness values listed in Table II representing mean values for all three types of fabrics from 3 parallel tests each. In the case of comparison tests A to L, primary washing tests were not made, since the object here was primarily to demonstrate the inadequate secondary washing power, and the primary washing power, which is likewise reduced is irrelevant here.

TABLE I

| Example | % Aluminosilicate | % CMOS | % TPP |
|---|---|---|---|
| 1 | 20 (57.1) | 10 (28.6) | 5 (14.3) |
| 2 | 20 (54.1) | 12 (32.4) | 5 (13.5) |
| 3 | 25 (65.8) | 8 (21.0) | 5 (13.2) |
| 4 | 25 (65.5) | 10 (25.0) | 5 (12.5) |
| 5 | 25 (61.0) | 12 (29.3) | 4 (9.7) |
| 6 | 25 (57.5) | 15 (34.5) | 3.5 (8.0) |
| 7 | 30 (66.7) | 10 (22.2) | 5 (11.1) |
| 8 | 30 (65.2) | 12 (26.1) | 4 (8.7) |
| 9 | 30 (61.2) | 15 (30.6) | 4 (8.2) |
| 10 | 30 (60.0) | 15 (30.0) | 5 (10.0) |
| | Comparison builder salt mixtures | | |
| A | 20 | 10 | — |
| B | 20 | 15 | — |
| C | 20 | 20 | — |
| D | 25 | 10 | — |
| E | 25 | 15 | — |
| F | 30 | 10 | — |
| G | 30 | 15 | — |
| H | — | 10 | 5 |
| I | — | 15 | 5 |
| J | — | 20 | 5 |
| K | 20 | — | 5 |
| L | 30 | — | 5 |
| M | 20 | — | 20 |
| N | — | — | 40 |

For the determination of the secondary washing power, strands of cotton, from which the finish had been removed were washed in test washing machines at boiling temperature (95° C.), subsequently rinsed three times with water and spun, after which the treatment was repeated. The conditions are: washing time 15 minutes, water hardness 16°dH, detergent concentration: 7.5 gm/l, liquor ratio 1:10. After 25 washing tests the ash content (difference relative to untreated samples) and the incrustations were measured by gravimetry. For the determination of the incrustation, 2-3 gm of the textile sample (after thorough disintegration) are left for 12 hours in a humidity chamber, weighed, treated for 30 minutes at boiling temperature with a 5% aqueous EDTA solution, rinsed three times with distilled water, humidity conditioned for 12 hours, and then weighed again.

The results are listed in Table II.

TABLE II

| Example | Primary washing power whiteness washed at | | Secondary washing power | |
|---|---|---|---|---|
| Test | 95° C. | 60° C. | % Ash | % incrustation |
| 1 | 65 | 59 | 0.7 | 2.1 |
| 2 | 66 | 60 | 0.6 | 2.1 |
| 3 | 67 | 60 | 0.7 | 1.9 |
| 4 | 68 | 60 | 0.7 | 2.0 |
| 5 | 69 | 60 | 0.6 | 1.9 |
| 6 | 70 | 61 | 0.5 | 1.8 |
| 7 | 69 | 61 | 0.6 | 2.0 |
| 8 | 69 | 61 | 0.5 | 1.9 |
| 9 | 70 | 61 | 0.5 | 1.8 |
| 10 | 70 | 62 | 0.5 | 1.7 |
| A | — | — | 3.6 | 5.2 |
| B | — | — | 3.5 | 5.1 |
| C | — | — | 3.1 | 4.5 |
| D | — | — | 3.3 | 5.0 |
| E | — | — | 3.2 | 4.7 |
| F | — | — | 3.1 | 4.6 |
| G | — | — | 3.0 | 4.5 |
| H | — | — | 9.9 | 10.3 |
| I | — | — | 7.4 | 9.0 |
| J | — | — | 6.3 | 8.3 |
| K | — | — | 7.6 | 9.9 |
| L | — | — | 6.7 | 8.1 |
| M | 67 | 60 | 0.5 | 1.9 |
| N | 72 | 61 | 0.3 | 1.6 |

These results show that the secondary washing power of the washing agent compositions according to the invention far exceeds the secondary washing power of reference samples A to L, where the phosphate content likewise does not exceed 5% by weight. With regard to samples M and N, it must be kept in mind that the tripolyphosphate content of 20 and 40% by weight respectively is either 4 to 5.7 times or 8 to 11.4 times, respectively, higher than in the detergents according to the invention. Nevertheless the primary washing power of sample M is partly lower than that of the washing agent compositions according to the invention. The secondary washing power of sample M is of the same order as that of the washing agent compositions according to the invention, or the differences are so small that they are tolerable in view of the phosphate content, which is reduced by the factor 4 to 5.7. Only the conventional detergent N, whose phosphate content is 8 to 11.4 times that of the washing agent compositions according to the invention, is slightly superior; but in view of its increased sewage pollution, the higher phosphate content represent a considerable disadvantage.

The preceding specific embodiments are illustrative of the practice of the invention. It is to be understood however, that other expedients known to those skilled in the art or disclosed herein, may be employed without departing from the spirit of the invention or the scope of the appended claims.

I claim:

1. A builder salt mixture for washing, rinsing and cleansing agent compositions consisting essentially of:

(a) from 50% to 75% by weight of at least one water-insoluble, finely-divided, synthetic, crystalline alkali metal aluminosilicate containing at least some combined water and having primary particles in the size range of from 50μ to 0.01μ and a calcium binding power of from 50 to 200 mg CaO/gm of anhydrous active substance when measured at 22° C. by the Calcium Binding Power Test Method set out in the specification and the formula on the anhydrous basis $$0.7\text{-}1.5\ Me_2O.Al_2O_3.1.3\text{-}4.0\ SiO_2$$

where Me is an alkali metal, (b) from 20% to 35% by weight of at least one carboxymethyloxysuccinate selected from the group consisting of sodium carboxymethyloxysuccinate and potassium carboxymethyloxysuccinate, and (c) from 8% to 15% by weight, based on the anhydrous salt, of a tripolyphosphate selected from the group consisting of sodium tripolyphosphate and potassium tripolyphosphate.

2. The builder salt mixture of claim 1 wherein the amount of the components in % by weight is the following:

component (a), 52% to 70% by weight
component (b), 20% to 35% by weight
component (c), 8% to 12% by weight 3. A washing, rinsing and cleansing agent composition comprising builder salts, tensides, wash alkalies, and optionally other conventional additives for washing, rinsing and cleansing agent compositions wherein (A) said builder salts are present in an amount of from 25% to 60% by weight and consist of a builder salt mixture consisting essentially of:

(a) from 50% to 75% by weight of at least one water-insoluble, finely-divided, synthetic, crystalline alkali metal aluminosilicate containing at least some combined water and having primary particles in the size range of from 50μ to 0.01μ and a calcium binding power of from 50 to 200 mg CaO/gm of anhydrous active substance when measured at 22° C. by the Calcium Binding Power Test Method set out in the specification and the formula on the anhydrous basis $$0.7\text{-}1.5\ Me_2O.Al_2O_3.1.3\text{-}4.0\ SiO_2$$

where Me is an alkali metal, (b) from 20% to 35% by weight of at least one carboxymethyloxysuccinate selected from the group consisting of sodium carboxymethyloxysuccinate and potassium carboxymethyloxysuccinate, and (c) from 8% to 15% by weight, based on the anhydorus salt, of a tripolyphosphate selected from the group consisting of sodium tripolyphosphate and potassium tripolyphosphate, (B) said tensides are present in an amount of 5% to 20%, (C) said wash alkalies are present in an amount of from 0 to 8% by weight of sodium silicate and from 0 to 10% by weight of other wash alkalies, (D) said other conventional additives include from 0 to 30% by weight of sodium perborate-tetrahydrate, from 0 to 1% of organic nitrogen containing or phosphorus-containing sequestering agent and from 1% to 30% by weight of soil suspension agents, optical brighteners, enzymes, biocides, fabric softeners, dyes and perfumes, sodium sulfate and water, with the proviso that the amount of said tripolyphosphate component (c) in said washing, rinsing and cleansing agent composition does not exceed 5% by weight.

4. The washing, rinsing and cleansing agent composition of claim 3 wherein the amount of the components in said builder salt is the following:

component (a), from 52% to 70% by weight,
component (b), from 20% to 35% by weight,
component (c), from 8% to 12% by weight.

5. The washing, rinsing and cleansing agent composition of claim 3 wherein said builder salts are present in an amount of from 30% to 50% by weight.

6. The builder salt mixture of claim 1 wherein all three components are in the form of the sodium salt and said aluminosilicate has a calcium binding power of from 100 to 200 mg CaO/gm of anhydrous active substance.

7. The washing, rinsing and cleansing agent composition of claim 3 wherein, in said, builder salt mixture, all three components are in the form of the sodium salt and said aluminosilicate has a calcium binding power from 100 to 200 mg CaO/gm of anhydrous active substance.

8. The builder salt mixture of claim 2 wherein all three components are in the form of the sodium salt and said aluminosilicate has a calcium binding power of from 100 to 200 mg CaO/gm of anhydrous active substance.

9. The washing, rinsing and cleansing agent composition of claim 3 wherein, in said builder salt mixture, the amount of component (b) is from 8% to 15% by weight of said total washing, rinsing and cleansing agent composition.

10. The washing, rinsing and cleansing agent composition of claim 3 wherein said builder salts are present in an amount of from 30% to 50% by weight, said tensides are present in an amount of from 7% to 15% by weight, said sodium silicate is present in an amount of from 2% to 5% by weight, and said sodium perborate-tetrahydrate is present in an amount of from 15% to 25% by weight.

* * * * *